(12) United States Patent
Nakagawa et al.

(10) Patent No.: US 8,236,893 B2
(45) Date of Patent: Aug. 7, 2012

(54) POLYLACTIC ACID BASED RESIN MOLDED ARTICLES

(75) Inventors: Hiroyuki Nakagawa, Aichi-ken (JP); Katsushi Ito, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 863 days.

(21) Appl. No.: 11/898,938

(22) Filed: Sep. 18, 2007

(65) Prior Publication Data

US 2008/0076880 A1    Mar. 27, 2008

(30) Foreign Application Priority Data

Sep. 27, 2006 (JP) .................. 2006-262389

(51) Int. Cl.
  *C08J 5/00* (2006.01)
  *C08K 3/00* (2006.01)
  *C08L 23/00* (2006.01)
  *C08L 67/04* (2006.01)

(52) U.S. Cl. ......................................... 525/64; 525/65

(58) Field of Classification Search ............... 525/64, 525/65

See application file for complete search history.

(56) References Cited

U.S. PATENT DOCUMENTS

2004/0006200 A1 * 1/2004 Nakagawa et al. ............ 528/481
2007/0036972 A1 * 2/2007 Chang et al. .................. 428/364

FOREIGN PATENT DOCUMENTS

JP   A-2005-307128   11/2005

OTHER PUBLICATIONS

Iijima, electronic translation of the specification of JP 2005-307128 (Apr. 2005).*

* cited by examiner

*Primary Examiner* — Jeffrey Mullis

(74) *Attorney, Agent, or Firm* — Posz Law Group, PLC

(57) ABSTRACT

The polylactic acid based resin molded article is a molded article formed from a polylactic acid based resin composition comprising a polylactic acid based resin (A), a polypropylene (B) having a crystallinity of 20% by weight or less and a modified ethylene-α-olefin copolymer (C1) or a modified polyolefin (C2), wherein a treatment for accelerating crystallization of the polylactic acid based resin (A) is applied thereto. In the polylactic acid based resin composition, the polypropylene (B) having a crystallinity of 20% by weight or less is blended in an amount of from 10 to 90 parts by weight based on 90 to 10 parts by weight of the polylactic acid based resin (A). In addition, the modified ethylene-α-olefin copolymer (C1) or the modified polyolefin (C2) is blended in an amount of from 1 to 20 parts by weight based on 100 parts by weight in total of the polylactic acid based resin (A) and the polypropylene (B) having a crystallinity of 20% by weight or less.

5 Claims, No Drawings

POLYLACTIC ACID BASED RESIN MOLDED ARTICLES

BACKGROUND OF THE INVENTION

1. Field of the Invention

This invention relates to polylactic acid based resin molded articles which comprise polylactic acid which is a biodegradable resin.

2. Related Art

Synthetic resins which use petroleum as the material are broadly used, because they have excellent performance such as their light weight, corrosion resistance and easy molding, as well as their low costs. However, since their degradability under the natural environment is low and their exothermic power at the time of incineration is large, it is necessary to reconsider about the use of the aforementioned synthetic resins from the viewpoint of environmental protection. Under such circumstances, biodegradable resins have been drawing attention in recent years, because they are biodegraded after their use by the action of microorganisms, namely, the molecules once incorporated by microorganisms are converted into water, carbon dioxide and the like and discharged as a result of the metabolism carried out by the microorganisms.

Though there are various kinds of biodegradable resins, aliphatic polyesters as biodegradable resins of chemical synthesis system, particularly polylactic acid (PLA) as a non-petroleum system circulation type plant resin which uses lactic acid obtained by fermenting corn, sugar cane or the like as the material, are particularly expected because of the superior performance and low cost. However, polylactic acid is unsuitable for applications which require heat resistance, because it has low heat resistance and is apt to change the shape by undergoing influence of heat.

On the other hand, a technique so-called polymer blend or polymer alloy is conventionally known as one of the methods for improving physical properties of resins. According to this technique, a different species of resin is mixed and kneaded with another resin which becomes the object of the physical property improvement. Attempts have also been made to improve heat resistance of polylactic acid using this technique. For example, JP-A-2005-307128 discloses a polylactic acid based resin composition in which a crystalline polypropylene system resin composition comprising a modified polypropylene resin and inorganic filler are mixed with polylactic acid. The modified polypropylene resin is a product obtained by carrying out graft modification of a crystalline modified polypropylene system resin with an ethylenic unsaturated bond-containing carboxylic acid or an anhydride or derivative thereof.

However, by the polylactic acid based resin composition described in JP-A-2005-307128, in which a crystalline polypropylene system resin composition and inorganic filler are mixed with polylactic acid, heat resistance of polylactic acid can be improved, but on the contrary, its Young's modulus in flexure is increased due to its hardening. Accordingly, there is a problem in that this polylactic acid based resin composition cannot be applied to resin molded articles which also require flexibility in addition to heat resistance.

SUMMARY OF THE INVENTION

The invention has been made by taking such actual circumstances into consideration, and its object is to provide polylactic acid based resin molded articles which have both of heat resistance and flexibility.

In order to attain the aforementioned problems, the gist of the first embodiment of the invention resides in a polylactic acid based resin molded article which is a molded article formed from a polylactic acid based resin composition comprising a polylactic acid based resin (A), a polypropylene (B) having a crystallinity of 20% by weight or less and a modified ethylene-α-olefin copolymer (C1) or a modified polyolefin (C2), characterized in that a treatment for accelerating crystallinity of the polylactic acid based resin (A) is applied to said molded article.

According to the construction, the polypropylene (B) in the polylactic acid based resin composition has flexibility due to its low crystallinity of 20% by weight or less. In addition, the modified ethylene-α-olefin copolymer (C1) or modified polyolefin (C2) shows compatibility or dispersibility with both of the polylactic acid based resin (A) and polypropylene (B) having a crystallinity of 20% by weight or less. In this connection, the polypropylene (B) having a crystallinity of 20% by weight or less is simply called polypropylene (B) hereinafter.

Accordingly, when the polylactic acid based resin composition comprising a polylactic acid based resin (A), a polypropylene (B) and a modified ethylene-α-olefin copolymer (C1) or modified polyolefin (C2) is mixed under a melting condition, the polypropylene (B) is converted into particles having small particle size, coated with the modified ethylene-α-olefin copolymer (C1) or modified polyolefin (C2), dispersed in the polylactic acid based resin (A) under an evenly distributed state. Thereafter, the melted and mixed polylactic acid based resin composition is formed into a predetermined shape and solidified by cooling.

In the thus obtained polylactic acid based resin molded article, particles of the polypropylene (B) contribute to the softening of the polylactic acid based resin molded article. Accordingly, flexibility of this polylactic acid based resin molded article becomes higher than the flexibility of a polylactic acid based resin molded article solely comprising the polylactic acid based resin (A). In addition, coat film of the modified ethylene-α-olefin copolymer (C1) or modified polyolefin (C2) which wraps the particle of polypropylene (B) makes up for the low heat resistance of polypropylene (B) and thereby improves heat resistance of the polylactic acid based resin molded article.

By the way, it is hard to say that heat resistance of the polylactic acid based resin molded article obtained in the manner is sufficiently improved. This is because heat resistance of the part of polylactic acid based resin (A) in the polylactic acid based resin molded article is still low. Regarding this point, in the first embodiment of the invention, crystallinity of the polylactic acid based resin (A) itself is increased and the heat resistance is improved by performing a treatment for accelerating crystallinity in carrying out molding of the resin. As a result, heat resistance of the polylactic acid based resin molded article becomes higher than the case of the one comprising the polylactic acid based resin (A) alone, in combination with the heat resistance improving effect by the coating of the modified ethylene-α-olefin copolymer (C1) or modified polyolefin (C2).

In this connection, as described in the second embodiment of the invention, it is desirable that the polypropylene (B) is blended in an amount of from 10 to 90 parts by weight based on 90 to 10 parts by weight of the polylactic acid based resin (A), in the polylactic acid based resin composition. When total amount of the polylactic acid based resin (A) and polypropylene (B) is set to 100 parts by weight, heat resistance is lowered when the polylactic acid based resin (A) is smaller than 10 parts by weight, while ensuring of the flexibility becomes difficult when larger than 90 parts by weight.

In addition, it is desirable that the modified ethylene-α-olefin copolymer (C1) or modified polyolefin (C2) is blended in an amount of from 1 to 20 parts by weight based on 100 parts by weight in total of the polylactic acid based resin (A) and polypropylene (B). When it is smaller than 1 part by weight, stabilization of morphology by coat film cannot be effected so that the appearance and heat resistance improving effect can be hardly obtained. When it is larger than 20 parts by weight, the coat film becomes too thick so that the flexibility improving effect by polypropylene (B) is spoiled and the polylactic acid based resin molded article becomes hard.

Gist of the third embodiment of the invention resides in that a crystal nucleus agent is added to the polylactic acid based resin composition in the first or second embodiment of the invention.

According to the aforementioned construction, crystallization of the polylactic acid based resin molded article at the time of its molding is accelerated by the addition of the crystal nucleus agent. Heat resistance of the polylactic acid based resin molded article is improved in comparison with the case of not using the crystal nucleus agent.

In this connection, as the modified ethylene-α-olefin copolymer (C1), an ethylene-propylene copolymer (EPR) modified by maleic anhydride can be used as described in the forth embodiment of the invention.

In addition, as the modified polyolefin (C2), a polypropylene modified by maleic anhydride as described in the fifth embodiment of the invention, or a polyethylene modified by an epoxy modifier as described in the sixth embodiment of the invention, can be used.

Gist of the seventh embodiment of the invention resides in that the aforementioned treatment for accelerating crystallization is an annealing treatment as described in any one of the first to sixth embodiments of the invention. As this annealing treatment, for example, as described in the eighth embodiment of the invention, surface temperature of the resin molded article mold may be kept at the crystallization temperature of the polylactic acid based resin (A) in carrying out the resin molded article.

When the resin molded article is carried out using a mold for the resin molded article whose surface temperature is kept at the crystallization temperature of the polylactic acid based resin (A), crystallization of the polylactic acid based resin (A) progresses so that its crystallinity is increased and heat resistance of the polylactic acid based resin molded article is improved.

According to the invention, polylactic acid based resin molded articles simultaneously having high heat resistance and high flexibility can be provided.

DETAILED DESCRIPTION OF THE PREFERRED EMBODIMENTS

The following describes the invention further in detail. As described in the foregoing, the polylactic acid based resin composition to be used in carrying out molding of the polylactic acid based resin molded articles basically comprises a polylactic acid based resin (A), a polypropylene (B) having a crystallinity of 20 by weight or less and a modified ethylene-α-olefin copolymer (C1) or modified polyolefin (C2). Next, each of these components is described.

<Polylactic Acid Based Resin (A)>

The polylactic acid based resin (A) is a polyester having lactic acid as the main component, which is used for adding biodegradability to a polylactic acid based resin molded article produced using a polylactic acid based resin composition. The polylactic acid based resin (A) contains lactic acid in an amount of preferably 50% or more, particularly preferably 75% or more. As the lactic acids to be used in the material of polylactic acid based resin (A), L-lactic acid, D-lactic acid, DL-lactic acid or a mixture thereof or lactide which is a cyclic dimmer of lactic acid can be exemplified.

The polylactic acid based resin (A) may contain other components such as those which comprises an aliphatic hydroxycarboxylic acid having from 2 to 10 carbon atoms other than lactic acid, an aliphatic dicarboxylic acid, an aliphatic diol or the like, or terephthalic acid or the like aromatic compound, within such a range that they do not spoil the object of the invention. It may contain a homopolymer or copolymer containing them as the main component or a mixture thereof. In addition, the polylactic acid based resin (A) may be a mixture in which a modified polylactic acid prepared by modifying polylactic acid with aliphatic or aromatic polyester is added to polylactic acid.

The polylactic acid based resin (A) can be obtained by a method in which the aforementioned material is directly subjected to dehydration condensation polymerization or a method in which the aforementioned cyclic dimmers of lactic acids or hydroxycarboxylic acids, such as lactide or glycollide, or a cyclic ester intermediate such as ε-caprolactone, are subjected to ring-opening polymerization. Weight average molecular weight of the polylactic acid based resin (A) is preferably 70,000≦weight average molecular weight<3,000,000, more preferably 100,000≦weight average molecular weight≦1,500,000.

<Polypropylene (B)>

In general, the aptness of a high polymer to perform crystallization varies depending on its stereoisomerism (regularity) even in the case of the same chemical structure. In the case of polypropylene, its stereoisomerism (regularity) includes an isotactic structure in which its side chains (methyl groups) are bonded to the main group at the same side, a syndiotactic structure in which they are alternately bonded and an atactic structure in which they are bonded with completely no regularity. In addition, its crystallization becomes difficult to effect in order of isotactic structure, syndiotactic structure and atactic structure.

As the polypropylene (B), those which have a crystallinity of 20% by weight or less are used. More preferred crystallinity is 15% or less. The crystallinity is weight ratio of the crystal structure occupying the entire material. A resin having large crystallinity has a tendency of more strongly expressing crystalline properties.

A non-crystalline polypropylene having atactic structure as its stereoisomerism and a crystallinity of 0% by weight is included in the polypropylene (B) which satisfies the aforementioned condition regarding the crystallinity.

It is desirable that the polypropylene (B) is blended in an amount of from 10 to 90 parts by weight based on 90 to 10 parts by weight of the polylactic acid based resin (A). When total amount of the polylactic acid based resin (A) and polypropylene (B) is set to 100 parts by weight, heat resistance is lowered when the polylactic acid based resin (A) is smaller than 10 parts by weight, while ensuring of the flexibility becomes difficult when larger than 90 parts by weight.

<Modified Ethylene-α-Olefin Copolymer (C1)>

The ethylene-α-olefin copolymer is a polymer obtained by copolymerizing ethylene-with an α-olefin, namely an olefin having a double bond in its terminal part, and its examples include an ethylene-propylene copolymer (EPR). As the modified ethylene-α-olefin copolymer (C1), those in which the ethylene-propylene copolymer (EPR) is graft-modified with anhydride of an ethylenic unsaturated bond-containing carboxylic acid, preferably anhydride of an unsaturated carboxylic acid, maleic anhydride, are used. In this connection, the ethylenic unsaturated bond-containing carboxylic acid or an anhydride thereof is a compound having both of an ethylenic unsaturated bond and carboxyl group in one molecule, and the aforementioned maleic anhydride is included in one of them.

<Modified Polyolefin (C2)>

As the modified polyolefin (C2), a modified polypropylene (PP) or a modified polyethylene (PE) can be exemplified.

As the modified polypropylene, those in which a crystalline polypropylene is graft-modified with anhydride of an ethylenic unsaturated bond-containing carboxylic acid, preferably an hydride of an unsaturated carboxylic acid, maleic anhydride, are used. In this connection, a case in which maleic anhydride is contained as a composing unit in the principal chain or a side chain of the crystalline polypropylene can be exemplified as the modified polypropylene.

As the modified polypropylene, a polyethylene modified with an epoxy modifier, such as a copolymer of an unsaturated epoxy compound with ethylene, is used. Any one of random, block and graft copolymers is included in this copolymer. The unsaturated epoxy compound means a compound which contains both of an unsaturated bond and epoxy group. As such an unsaturated epoxy compound, glycidyl methacrylate (GMA), glycidyl acrylate (GA), allyl glycidyl ether, a glycidyl compound and the like can for example be cited. The copolymer of an unsaturated epoxy compound with ethylene may be used alone or as a mixture of two or more species.

As the copolymer of an unsaturated epoxy compound with ethylene, a graft copolymer prepared by grafting polyethylene with an unsaturated epoxy compound (epoxy modifier) is particularly desirable. As the base polyethylene, for example, any one of high density polyethylene (HDPE), low density polyethylene (HDPE), linear low density polyethylene (LLDPE) and very low density polyethylene (VLDPE) can be used, or these may be used in combination. In addition, butene-1, hexene or the like other component may be copolymerized.

The reaction of polyethylene with epoxy modifier can be carried out by either a solution method or a melt kneading method, preferably by a melt kneading method. In addition, a general radical polymerization catalyst (e.g., benzoyl peroxide or the like organic peroxide or the like) can be used as the catalyst. In this reaction, the epoxy modifier is graft-polymerized with polyethylene.

It is desirable that the aforementioned modified ethylene-α-olefin copolymer (C1) or modified polyolefin (C2) is blended in an amount of from 1 to 20 parts by weight based on 100 parts by weight in total of the aforementioned polylactic acid based resin (A) and the aforementioned polypropylene (B). When it is smaller than 1 part by weight, stabilization of morphology by coat film cannot be effected so that the appearance and heat resistance improving effect can hardly be obtained, and when it is larger than 20 parts by weight, the coat film becomes too thick so that the flexibility improving effect by polypropylene (B) is spoiled and the polylactic acid based resin molded article becomes hard.

In this connection, as occasion demands, various additive agents may be added as other components to the polylactic acid based resin composition of this embodiment, within such an amount that physical properties of the polylactic acid based resin composition are not spoiled. As the various additive agents, for example, a heat stabilizer, a light stabilizer, an antioxidant, an ultraviolet ray absorption (preventing) agent, a pigment, a coloring agent, a static electricity (electric static charge) preventing agent, a release agent, a perfume, an antibacterial agent, an antifungal agent, a flame retarder, a foaming agent, a plasticizer, a hydrolysis preventing agent, a defogging agent, a lubricant and the like can be cited.

In the polylactic acid based resin composition of this embodiment, for example, predetermined amounts of the aforementioned respective components are uniformly mixed by putting them into a high speed agitator and stirring them. In order to produce a polylactic acid based resin molded article having a desired shape from the thus obtained polylactic acid based resin composition, firstly, the polylactic acid based resin composition is made into granules by uniformly melt-kneading it at a predetermined temperature for example by a mono-axial or twin screw extruder. From the viewpoint of improving dispersion, a twin screw extruder is suitable than a mono-axial extruder. The granulated pellet is melted in an injection molding machine and injected into the cavity of a closed mold.

In this case, the polypropylene (B) in the aforementioned molten resin is possessed of flexibility due to its low crystallinity in comparison with that of crystalline polypropylene. In addition, the modified ethylene-α-olefin copolymer (C1) or modified polyolefin (C2) shows compatibility or dispersibility with both of the polylactic acid based resin (A) and polypropylene (B). The term "shows compatibility or dispersibility" means that it has the ability to be mixed with both of the components polylactic acid based resin (A) and polypropylene (B), and shows such a characteristic that phase separation and the like do not occur even after its melt-mixing with both components.

Accordingly, in the aforementioned molten resin, morphology of the polylactic acid based resin composition becomes the following sea island structure. That is, the polypropylene (B) becomes particles having a small particle size, each particle is coated with the modified ethylene-α-olefin copolymer (C1) or modified polyolefin (C2) and thereby becomes a shape of island, and they are dispersed in a uniformly distributed state in the sea-like polylactic acid based resin (A). In this case, the modified ethylene-α-olefin copolymer (C1) or modified polyolefin (C2) improves dispersing condition of the polypropylene (B) in the polylactic acid based resin (A). From this point, it is greatly different from the case in which the mixed and dispersed state becomes poor when a general-purpose crystalline polypropylene is used.

In addition, when the aforementioned molted resin is filled in the cavity and then the mold is cooled, the molten resin is cooled and solidified so that a polylactic acid based resin molded article having a desired shape is obtained. Thereafter, the mold is opened and the polylactic acid based resin molded article is released.

In this connection, regarding the preparation method of the polylactic acid based resin composition and the molding method of the polylactic acid based resin molded articles, they are not limited to the aforementioned methods. That is, as the method for preparing the polylactic acid based resin composition, for example, methods which use a roller, a kneader, Brabender plastograph, Banbury mixer and the like can be cited. Also, as the method for molding the polylactic acid based resin molded articles, for example, extrusion molding, blow molding, inflation molding, profile extrusion molding, vacuum pressure forming and the like can be cited.

In the polylactic acid based resin molded articles obtained in the aforementioned manner, the polypropylene (B) by itself is possessed of flexibility due to its low crystallinity, and this is contributing to the softening of the polylactic acid based resin molded articles. Thus, flexibility of the polylactic acid based resin molded articles becomes higher than the case of a polylactic acid based resin molded article comprising the polylactic acid based resin (A) alone.

In addition, since particles of the polypropylene (B) are small and also dispersed in a uniformly distributed state, the surface of the polylactic acid based resin molded article becomes smooth so that its appearance is improved.

Since coat film of the modified ethylene-α-olefin copolymer (C1) or modified polyolefin (C2), which covers particles of the aforementioned polypropylene (B), compensates for the low heat resistance of polypropylene (B), it improves heat resistance of the polylactic acid based resin molded article.

By the way, it can hardly be said that heat resistance of the polylactic acid based resin molded article obtained in the aforementioned manner is sufficiently increased as a whole. This is because the part formed by the polylactic acid based resin (A) in the polylactic acid based resin molded article, namely the sea part in the sea island structure, still has low heat resistance. That is, though the polylactic acid based resin (A) is a crystalline resin, its crystallization rate is slow, and the crystallization therefore is not progressing in the molding process of the polylactic acid based resin molded article.

Accordingly, in carrying out the aforementioned molding of resin, a treatment is carried out for accelerating crystallization of the polylactic acid based resin (A). As this treatment, an annealing treatment is carried out in this embodiment of the invention. More illustratively, the molding of resin is carried out by keeping surface temperature of the mold at 110° C. which is the crystallization temperature of the polylactic acid based resin (A). By this annealing treatment, crystallization of the polylactic acid based resin (A) progresses so that its crystallinity is increased and its heat resistance is improved.

The aforementioned annealing treatment is a method that can be regarded as a so-called internal die annealing, which is carried out simultaneously with the molding of resin in the same the mold by adjusting surface temperature of the mold, but the annealing treatment may be carried out after injection molding instead of this. For example, the annealing treatment may be carried out after the injection molding using a vacuum dryer or the like dryer.

In addition, it is desirable that the aforementioned annealing treatment is carried out under such a condition that a crystal nucleus agent is blended with the aforementioned polylactic acid based resin (A). The crystal nucleus agent is added in order to improve crystalline property (crystallization rate) of the polylactic acid based resin composition at the time of carrying out the molding. As the crystal nucleus agent, a substance close to the crystal is used. When a crystal nucleus agent is put in a molten material and cooled, molecules are systematically arranged around the crystal nucleus agent, and the crystallization progresses using this as the starting point.

This type of crystal nucleus agent is divided into those of inorganic system and of organic system. As the crystal nucleus agent of inorganic system, for example, talc, kaolin, kaolin clay, barium sulfate, silica, calcium lactate, sodium benzoate and the like can be cited. As the crystal nucleus agent of organic system, for example, aromatic carboxylic acid metal salts, aromatic phosphoric acid esters, aromatic amide esters, an aliphatic amide, an organic sulfonic acid salt, a rhodinic acid derivative, a benzylidene sorbitol compound, a plant wax, a metal salt of (meth) acrylic acid system copolymer and the like can be cited. In addition, as an organic system crystal nucleus agent, for example, organized clay in which a layered clay mineral having cation exchange capacity is organized by an organic ammonium salt compound may be used. These crystal nucleus agents may be used alone or as a mixture of two or more.

It is desirable that the crystal nucleus agent is added in an amount of from 0.1 to 10 parts by weight based on 100 parts by weight of the polylactic acid based resin (A). Crystalline property of the polylactic acid based resin composition cannot be improved sufficiently when it is smaller than 0.1 part by weight, and when it is larger than 10 parts by weight, dispersion of the crystal nucleus agent becomes insufficient so that the appearance improving effect can hardly be obtained.

By the addition of the aforementioned crystal nucleus agent, crystallization of the polylactic acid based resin molded articles at the time of the molding is accelerated. In comparison with the case of carrying our the annealing treatment without using the crystal nucleus agent, heat resistance of the polylactic acid based resin molded articles is further improved. As a result, heat resistance of the polylactic acid based resin molded articles become higher than the case of the one comprising the polylactic acid based resin (A) alone, in combination with the heat resistance improving effect by the aforementioned coating of the modified ethylene-α-olefin copolymer (C1) or modified polyolefin (C2).

The aforementioned polylactic acid based resin molded articles can be used in such applications as electric and electronic parts, building and public works members, automobile parts, agricultural materials, packaging materials, clothing, daily necessities and the like. For example, as the automobile parts, instrument panel, center console, console box, rear package tray, cup holder, assist grip and the like interior parts, wheel cap, bumper moulding, back panel and the like exterior parts and the like can be cited.

EXAMPLES

Next, the aforementioned embodiments are further illustratively described with reference to inventive and comparative examples.

Firstly, in each of the Inventive Examples 1 to 8 and Comparative Examples 1 to 5, the respective components shown in the upper columns of Table 1 were blended and then kneaded at 200° C. using a twin screw extruder. Test pieces having predetermined shape and size were molded by carrying out injection molding, by setting the molding temperature to 200° C. and keeping surface temperature of the mold at 110° C. Thereafter, the measurements and evaluations shown in the following were carried out on each of the thus obtained test pieces. The results are shown in the lower columns of Table 1. In this connection, each of the numerical values on the blending contents in Table 1 means weight part(s). Also, as the respective components of the blending contents, the materials described in the lower part of Table 1 were used. In addition, in the aforementioned treatments, the treatment for carrying out injection molding by keeping surface temperature of the resin mold at 110° C. corresponds to an annealing treatment.

In addition, in the blending contents, the polylactic acid and modified polylactic acid (described as "modified PLA" in Table 1) were used as the polylactic acid based resin (A). The cases of the non-crystalline polypropylene alone and the blend of non-crystalline polypropylene with crystalline polypropylene were used as the polypropylene (B). The maleic anhydride-modified polypropylene and epoxy-modified polyethylene were used as the modified polyolefin (C2). The maleic anhydride-modified EPR was used as the modified ethylene-α-olefin copolymer (C1).

<Evaluation of Flexibility>

As the evaluation of flexibility, Young's modulus in flexure was measured in accordance with the ISO 178. Larger numerical value means that the sample is solid, and smaller numerical value that the sample is superior in flexibility.

<Evaluation of Heat Resistance>

As the evaluation of heat resistance, heat resistance distortion was measured in accordance with the ISO 75-2. In carrying out the measurement, each test piece was arranged in an oil bath capable of increasing temperature at a constant rate (120° C./hour), and distortion of the test piece when a certain load was applied thereto at 110° C. was used as the heat resistance distortion. Smaller numerical value of the heat resistance distortion means that the sample has small distortion and is superior in heat resistance.

<Evaluation of Surface Appearance>

As the evaluation of surface appearance, smoothness of the test piece surface was evaluated with the naked eye by a sensory test. When the surface of test piece was smooth having no irregularity, the result was judged "I", and the other case, namely a case in which an irregularity was found on the test piece surface even if it was small, was judged "II".

polypropylene. Based on these results, it can be seen that non-crystalline polypropylene is contributing to the improvement of flexibility. In addition, a heat resistance improving effect can be obtained by the coating of non-crystalline polypropylene with maleic anhydride-modified polypropylene.

It can be seen from Comparative Examples 3 and 4 and Inventive Examples 1 to 4 that there is an appropriate range on the blending amount of non-crystalline polypropylene based on polylactic acid. In Comparative Example 3 in which 5 parts by weight of non-crystalline polypropylene was blended based on 95 parts by weight of polylactic acid, Young's modulus in flexure was large which was similar to that in Comparative Example 1. It is considered that this is because non-crystalline polypropylene was smaller than its proper amount so that the softening effect was not sufficiently obtained. In Comparative Example 4 in which 95 parts by weight of non-crystalline polypropylene was blended based on 5 parts by weight of polylactic acid, Young's modulus in flexure became small, but heat resistance distortion was increased, and heat resistance was greatly worsened. Since the non-crystalline polypropylene itself is possessed of flex-

TABLE 1

|  | Inventive Examples | | | | | | | | Comparative Examples | | | | |
| --- | --- | --- | --- | --- | --- | --- | --- | --- | --- | --- | --- | --- | --- |
|  | 1 | 2 | 3 | 4 | 5 | 6 | 7 | 8 | 1 | 2 | 3 | 4 | 5 |
| Blend contents | | | | | | | | | | | | | |
| Polylactic acid (*a) | 70 | 50 | 30 | 50 | 40 | 50 | 50 | 30 | 100 | 50 | 95 | 5 | 50 |
| Modified PLA (*b) |  |  |  |  | 10 |  |  |  |  |  |  |  |  |
| Non-crystalline PP (*c) | 30 | 50 | 70 | 50 | 50 | 40 | 50 | 70 |  |  | 5 | 95 | 50 |
| Crystalline PP (*d) |  |  |  |  |  | 10 |  |  |  | 50 |  |  |  |
| Maleic anhydride-modified PP (*e) | 10 | 10 | 10 |  | 10 | 5 |  | 10 |  | 10 | 10 | 10 |  |
| Epoxy-modified PE (*f) |  |  |  |  |  |  | 10 |  |  |  |  |  |  |
| Maleic anhydride-modified EPR (*g) |  |  |  | 10 |  |  |  |  |  |  |  |  |  |
| Crystal nucleus agent (*h) | 1 | 1 | 1 | 1 | 1 | 1 | 1 |  | 1 | 1 | 1 | 1 | 1 |
| Material physical properties | | | | | | | | | | | | | |
| Young's modulus in flexure | 1500 | 1200 | 800 | 1000 | 1000 | 1400 | 1000 | 800 | 4000 | 2700 | 3500 | 100 | 1400 |
| Heat resistance distortion | 5 | 8 | 9 | 9 | 5 | 5 | 9 | 10 | 2.5 | 17 | 5 | 40 | 20 |
| Surface appearance | I | I | I | I | I | I | I | I | I | I | I | II | II |

(*a) Manufactured by Mitsui Chemical: H-100
(*b) Manufactured by Dainippon Ink & Chemicals: PD350
(*c) Manufactured by Sumitomo Chemical: X1102
(*d) Manufactured by Nihon Polypro: BC8
(*e) Manufactured by Mitsui Chemical: QE550
(*f) Manufactured by Sumitomo Chemical: BondFirst2B
(*g) Manufactured by Mitsui Chemical: MP0620
(*h) Manufactured by Nissan Chemical Industries: PPA-Zn In table 1, Comparative Example 1 in which the polylactic acid based resin composition consists of polylactic acid and crystal nucleus agent becomes a standard of the evaluation of respective examples. In Comparative Example 1, it can be seen that though it lacks in flexibility because of the large Young's modulus in flexure, its heat resistance distortion is small and heat resistance is good. Accordingly, it is considered that the crystallinity became large due to acceleration of crystallization by the addition of crystal nucleus agent and by the annealing treatment, thus resulting in the improvement of heat resistance.

Also, in Inventive Example 2 in which polylactic acid was blended with non-crystalline polypropylene, maleic anhydride-modified polypropylene and crystal nucleus agent, Young's modulus in flexure and heat resistance distortion were both small. Contrary to this, Young's modulus in flexure was large in Comparative Example 2 in which crystalline polypropylene was blended instead of non-crystalline polypropylene.

ibility but has a characteristic of inferior heat resistance on the contrary, it can be seen that this characteristic is greatly reflected on the physical properties of the test pieces.

In Inventive Example 2 in which non-crystalline polypropylene, maleic anhydride-modified polypropylene and crystal nucleus agent were blended with polylactic acid, Inventive Example 4 in which maleic anhydride-modified EPR was blended instead of maleic anhydride-modified polypropylene, and Inventive Example 7 in which epoxy-modified polyethylene was blended instead of maleic anhydride-modified polypropylene, Young's modulus in flexure was small and heat resistance distortion was less. Contrary to this, though Young's modulus in flexure became small, heat resistance distortion was large and heat resistance was not good in Comparative Example 5 in which polylactic acid was blended with non-crystalline polypropylene, but not blended with maleic anhydride-modified polypropylene, epoxy-modified polyethylene or maleic anhydride-modified EPR. It can be seen from these results that maleic anhydride-modified polypropylene, epoxy-modified polyethylene and maleic anhydride-modified EPR are contributing to the improvement of heat resistance.

In addition, in Inventive Example 5, polylactic acid and modified polylactic acid are used as the polylactic acid based resin (A), and non-crystalline polypropylene, maleic anhydride-modified polypropylene and crystal nucleus agent are blended with this. Also in this case, small values were obtained as both of the Young's modulus in flexure and heat resistance distortion, similar to the case of Inventive Example 2 in which polylactic acid alone was used as the polylactic acid based resin (A), and non-crystalline polypropylene, maleic anhydride-modified polypropylene and crystal nucleus agent were blended with this.

Also, in Inventive Example 6, 10 parts by weight of crystalline polypropylene (crystallinity 60% by weight) is blended with non-crystalline polypropylene (crystallinity 0% by weight). This corresponds to a polypropylene of 15% by weight in crystallinity. And polylactic acid, maleic anhydride-modified polypropylene and crystal nucleus agent are blended with them. Also in this case, small values were obtained as both of the Young's modulus in flexure and heat resistance distortion, similar to the case of Inventive Examples 1 to 3 in which crystalline polypropylene is not blended.

In Inventive Example 8 which is different from Inventive Example 3 in terms that crystal nucleus agent is not used, a value close to that of Inventive Example 3 was obtained as the heat resistance distortion. It can be seen from this result that maleic anhydride-modified polypropylene compensates for the low heat resistance by coating non-crystalline polypropylene, and sufficient heat resistance can be realized without using crystal nucleus agent by further carrying out the annealing treatment, though not equal to Inventive Example 3.

Regarding the surface appearance, minute irregularity was found on the surface of the test piece and the surface was not smooth in Comparative Example 5 in which none of the maleic anhydride-modified polypropylene, epoxy-modified polyethylene and maleic anhydride-modified EPR was blended. Though maleic anhydride-modified polypropylene was blended, a surface appearance having similar irregularity was found also in Comparative Example 4 having less blending amount of polylactic acid. Contrary to this, irregularity was not found on the surface of all test pieces and the surface was smooth, in Inventive Examples 1 to 8 in which any one of the maleic anhydride-modified polypropylene, epoxy-modified polyethylene and maleic anhydride-modified EPR was blended, and polypropylene (B) was blended in an amount of from 10 to 90 parts by weight based on 90 to 10 parts by weight of polylactic acid based resin (A). Based on these results, it is considered that particles of the polypropylene are small and dispersed in a uniformly distributed state by the blending of maleic anhydride-modified polypropylene and the like, and as a result, the surface of test pieces becomes smooth and its appearance is improved. In addition, it is considered also that such effects can be obtained on condition that the polylactic acid based resin (A) is blended in a certain degree of amount.

What is claimed is:

1. A polylactic acid-based resin molded article which is a molded article formed from a polylactic acid-based resin composition comprising:
    a polylactic acid-based resin (A),
    a polypropylene (B) including a non-crystalline polypropylene having a crystallinity of 0% by weight, and
    a modified ethylene-α-olefin copolymer (C1) or a modified polyolefin (C2),
    wherein an annealing treatment during or after molding of resin for accelerating crystallization of the polylactic acid-based resin (A) is applied to said resin molded article,
    wherein the polypropylene (B) is blended in an amount of from 10 to 90 parts by weight based on 90 to 10 parts by weight of the polylactic acid based on resin (A), and the modified ethylene-α-olefin copolymer (C1) or the modified polyolefin (C2) is blended in an amount of from 1 to 20 parts by weight based on 100 parts by weight and total of the polylactic acid-based resin (A) and the polypropylene (B), and
    wherein a crystal nucleus agent is added to the polylactic acid-based resin composition in an amount of from 0.1 to 10 parts by weight based on 100 parts by weight of the polylactic acid-based resin (A).

2. The polylactic acid-based resin molded article defined in claim 1, wherein the modified ethylene-α-olefin copolymer (C1) is an ethylene-propylene copolymer modified by maleic anhydride.

3. The polylactic acid-based resin molded article defined in claim 1, wherein the modified polyolefin (C2) is a polypropylene modified by maleic anhydride.

4. The polylactic acid-based resin molded article defined in claim 1, wherein the modified polyolefin (C2) is a polypropylene modified by an epoxy modifier.

5. The polylactic acid-based resin molded article defined in claim 1, wherein a crystalline polypropylene is blended into the polypropylene (B) including the non-crystalline polypropylene having a crystallinity of 0% by weight, and the resulting blended polypropylene (B) has a crystallinity of 20% by weight or less.

* * * * *